US012722885B2

(12) United States Patent
Zhang et al.

(10) Patent No.: US 12,722,885 B2
(45) Date of Patent: Sep. 1, 2026

(54) TRASH CAN EASY TO PRODUCE

(71) Applicant: Hangzhou Yixiang Technology Research and Development Co., Ltd., Hangzhou (CN)

(72) Inventors: Tongyi Zhang, Hangzhou (CN); Zhichao Ye, Hangzhou (CN)

(73) Assignee: Hangzhou Yixiang Technology Research and Development Co., Ltd., Hangzhou (CN)

( * ) Notice: Subject to any disclaimer, the term of this patent is extended or adjusted under 35 U.S.C. 154(b) by 0 days.

(21) Appl. No.: 18/796,341

(22) Filed: Aug. 7, 2024

(65) Prior Publication Data

US 2025/0115423 A1 Apr. 10, 2025

(30) Foreign Application Priority Data

Oct. 9, 2023 (CN) ......................... 202322697539.4

(51) Int. Cl.
*B65F 1/16* (2006.01)

(52) U.S. Cl.
CPC ...... *B65F 1/1646* (2013.01); *B65F 2220/101* (2013.01); *B65F 2250/114* (2013.01)

(58) Field of Classification Search
CPC .............. B65F 1/1646; B65F 2220/101; B65F 2250/114; B65F 2220/106; B65D 21/086
USPC .......... 220/4.08, 4.09, 4.34, 890, 4.28, 4.01, 220/4.31
See application file for complete search history.

(56) References Cited

U.S. PATENT DOCUMENTS 5,560,508 A * 10/1996 Hsu ........................ D06F 95/002 220/4.31
7,861,458 B2 * 1/2011 Apps .................. B65D 11/1833 220/254.1
2005/0016999 A1 1/2005 Richardson et al.
2010/0116822 A1 * 5/2010 Perelli ................... B65F 1/0053 220/4.03
2020/0148468 A1 * 5/2020 Munaro ................ B65F 1/1646

* cited by examiner

*Primary Examiner* — Jeffrey R Allen
*Assistant Examiner* — Elizabeth J Volz

(57) ABSTRACT

The present disclosure provides a trash can easy to produce. The trash can includes a left face plate configured to seal a left side of the trash can, a right face plate configured to seal a right side of the trash can, a front face plate configured to seal a front side of the trash can, a rear face plate configured to seal a rear side of the trash can, and a bottom face plate configured to seal a bottom of the trash can. At least one of the left face plate, the right face plate, the rear face plate and the front face plate is clamped and fixed to the bottom face plate. At least three of the left face plate, the right face plate, the rear face plate and the front face plate have a same structure.

10 Claims, 10 Drawing Sheets

TRASH CAN EASY TO PRODUCE

CROSS REFERENCE TO RELATED APPLICATIONS

The present application claims the benefit of Chinese Patent Application No. 202322697539.4 filed on Oct. 9, 2023, the contents of which are incorporated herein by reference in their entirety.

TECHNICAL FIELD

The present disclosure relates to the technical field of trash cans, and more specifically and particularly relates to a trash can easy to produce.

BACKGROUND

Trash cans have already become necessary in people's daily life, which are placed in positions where people conveniently dispose of trash in daily life. At present, most trash cans use supports of rigid materials. In order to facilitate transport, the trash cans can be stacked in a transport process and assembled at a destination, such as the patent with the publication number US20050016999A1. It is composed of a bottom wall, four side walls and a top wall. The four side walls need to be manufactured with at least three molds, leading to high mold cost.

SUMMARY

An objective of the present disclosure is to overcome defects in the prior art and provide a trash can easy to produce, which can reduce mold cost.

In order to achieve the above objective, the present disclosure provides a trash can easy to produce. The trash can includes a left face plate configured to seal a left side of the trash can, a right face plate configured to seal a right side of the trash can, a front face plate configured to seal a front side of the trash can, a rear face plate configured to seal a rear side of the trash can, and a bottom face plate configured to seal a bottom of the trash can. At least one of the left face plate, the right face plate, the rear face plate and the front face plate is clamped and fixed to the bottom face plate.

At least three of the left face plate, the right face plate, the rear face plate and the front face plate have a same structure. Alternatively, at least three of the left face plate, the right face plate, the rear face plate and the front face plate are injection-molded with a same mold.

The left face plate, the right face plate, the rear face plate and the front face plate all have a same structure. Alternatively, the left face plate, the right face plate, the rear face plate and the front face plate are all injection-molded with a same mold.

The trash can includes a connector and a cover assembly that is located on a top of the trash can. The cover assembly is rotatably connected to the rear face plate by means of the connector. The connector is clamped or detachably connected to the rear face plate.

The rear face plate includes a top wall on a top of the rear face plate and a flange extending upward from the top wall. The connector includes a first buckle and a second buckle. The first buckle is clamped and fixed to the top wall. The second buckle is clamped and fixed to the flange.

The flange includes a mounting part matched with the second buckle. The mounting part is clamped and fixed to the second buckle.

The connector includes a hinge column configured for rotary connection. The cover assembly includes a cover frame located on an outer edge of the cover assembly. The cover frame is provided with a hinge seat matched with the hinge column. The hinge column is at least partially accommodated in the hinge seat.

The front face plate is provided with an indication plate. The indication plate includes a third buckle. The third buckle is clamped to the mounting part located on the front face plate.

The trash can includes a trash bag. An opening of the trash bag sleeves the flange. Alternatively, the flange is provided with a notch, the trash bag is partially located in the notch, and a wall of the notch abuts against the trash bag.

The cover frame is provided with an anti-skid pad. The anti-skid pad abuts against the trash bag. The flange supports the trash bag. The trash bag is partially located between the anti-skid pad and the flange.

The right face plate includes a first interlocking column located on a bottom of the right face plate. The bottom face plate is provided with a first interlocking socket matched with the first interlocking column. The first interlocking column is at least partially accommodated in the first interlocking socket. The first interlocking column is clamped to the first interlocking socket. The first interlocking column includes a boss structure. The first interlocking socket is provided with a fixing recess. The boss is clamped to the fixing recess.

Beneficial Effects

It can be seen from the technical solution that, compared with the prior art, the present disclosure has the following advantages:

1. At least three of the left face plate, the right face plate, the front face plate and the rear face plate of the trash can have the same structure, and four face plates require at most two molds, such that a number of molds can be reduced, and further mold cost and production cost can be decreased. Further, the four face plates have the same structure, which can be manufactured with only one mold, such that mold cost can be further reduced.
2. The cover assembly and the rear face plate of the trash can are rotatably connected by means of the connector, and the rear face plate is clamped or detachably connected to the connector that may be conveniently mounted by a user. Because of the same structure of the left face plate, the right face plate, the front face plate and the rear face plate, the connector may be mounted on any one of the four face plates during mounting. After the connector is mounted, if the face plate is the rear face plate, a mounting step that the user needs to check whether a face plate is the rear face plate before mounting the connector can be omitted, such that mounting efficiency can be improved.
3. The front face plate is provided with the indication plate, on which the user may make a classification indicator of the trash can, such that use is facilitated.
4. The trash can is internally provided with the anti-skid pad. The anti-skid pad that presses the trash bag can enhance a pulling force on the trash bag, so as to reduce a possibility that the trash bag falls into the trash can when the user throws trash.
5. The flange is provided with the notch. During use of a trash bag having a small opening diameter, it may be tightened at the notch, such that tension of a mouth of the trash bag can be enhanced, a possibility that the trash bag falls into the trash can be reduced, and meanwhile, the user can select trash bags having different opening diameters.

REFERENCE NUMBERS

1—cover assembly; 11—cover frame; 111—hinge seat; 112—anti-skid pad; 12—connector; 121—hinge column; 122—first buckle; 123—second buckle; 2—front face plate; 21—vertical recess; 22—indication plate; 221—third buckle; 3—rear face plate; 31—top wall; 32—flange; 321—mounting part; 322—notch; 4—left face plate; 5—right face plate; 51—first interlocking column; 511—boss; 52—second interlocking column; 6—bottom face plate; 61—first interlocking socket; 611—fixing recess; 62—enclosure plate; 63—baffle; 7—supporting column; 71—second interlocking socket; 8—trash bag.

DETAILED DESCRIPTIONS OF THE EMBODIMENTS

Examples of the present disclosure will be clearly and completely described below with reference to the accompanying drawings.

Figure 1:
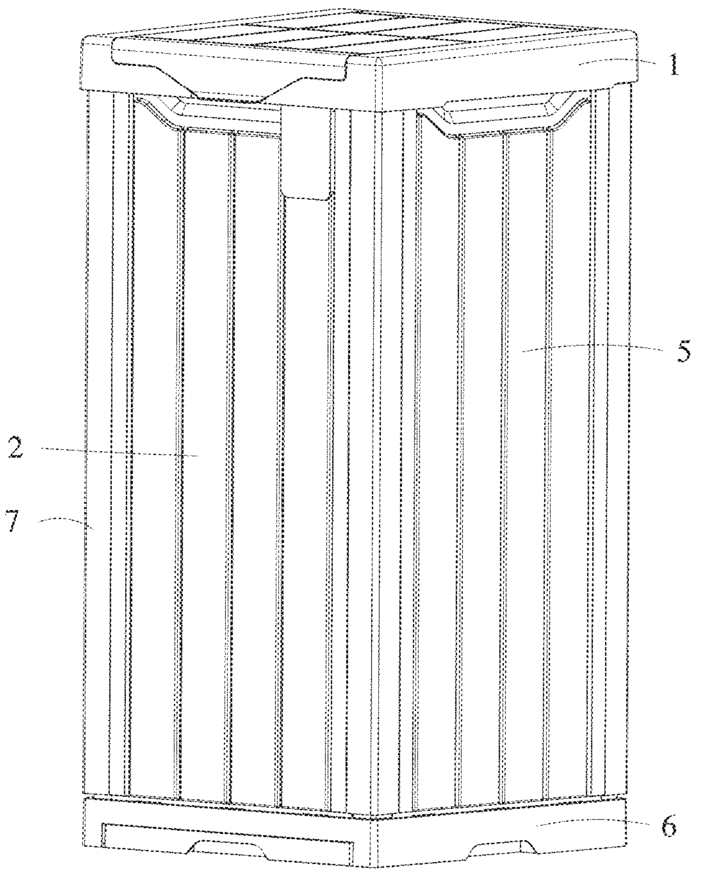
FIG. 1 is a schematic solid diagram of assembly of a trash can according to an example of the present disclosure.
Figure 2:
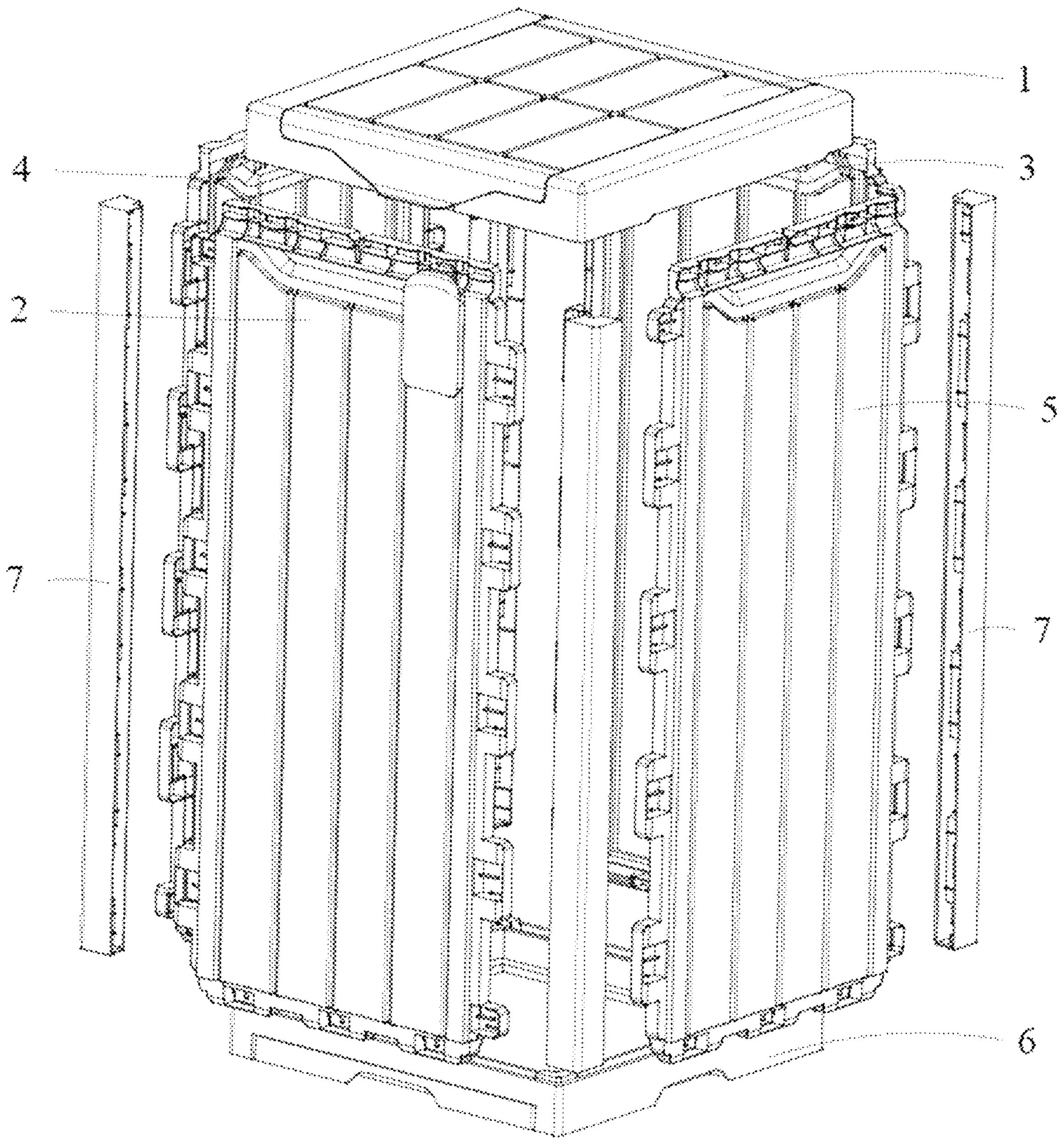
FIG. 2 is a schematic diagram of an exploded view of a trash can according to an example of the present disclosure.
Figure 3:
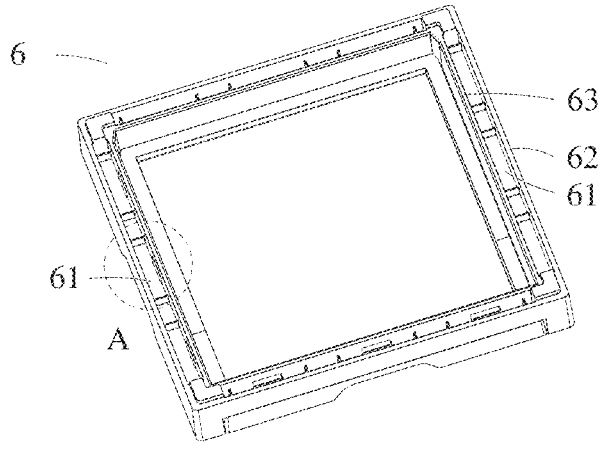
FIG. 3 is a schematic structural diagram of a bottom face plate of a trash can according to an example of the present disclosure.
Figure 4:
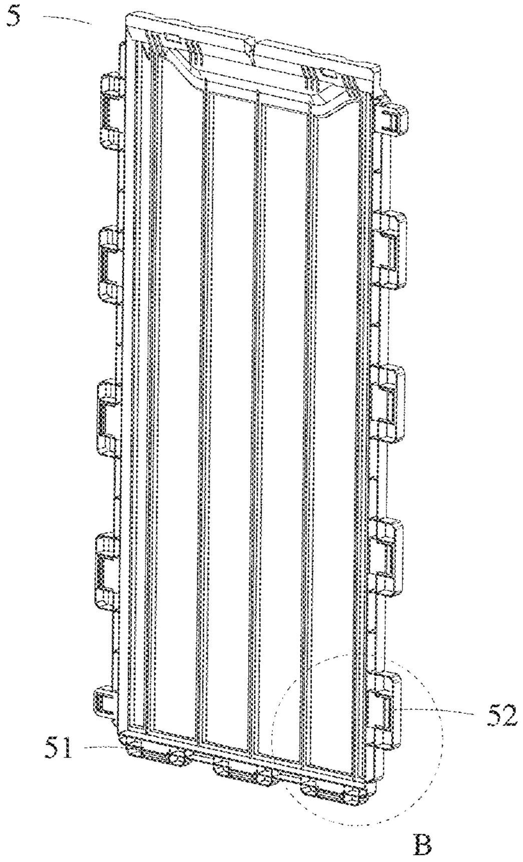
FIG. 4 is a schematic structural diagram of a right face plate of a trash can according to an example of the present disclosure.
Figure 5:
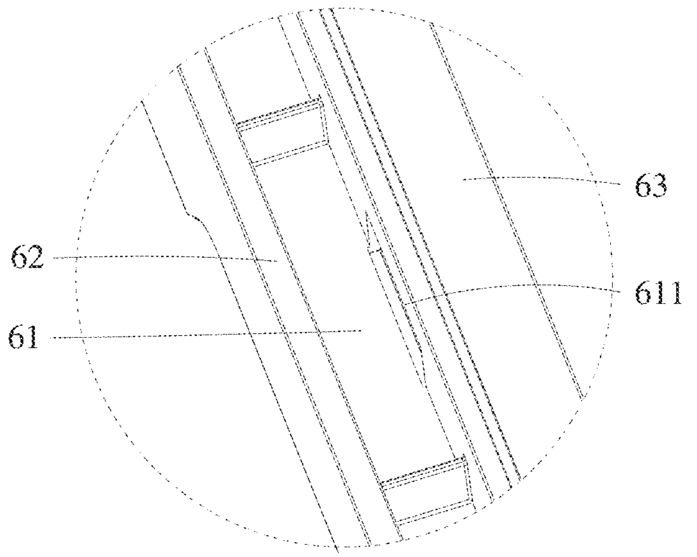
FIG. 5 is a schematic diagram of an enlarged view of A in FIG. 3.
Figure 6:
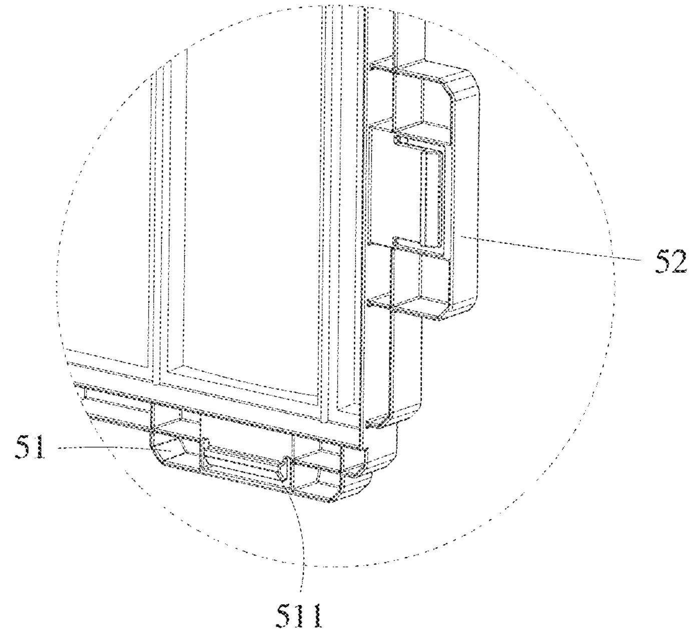
FIG. 6 is a schematic diagram of an enlarged view of B in FIG. 4.
Figure 7:
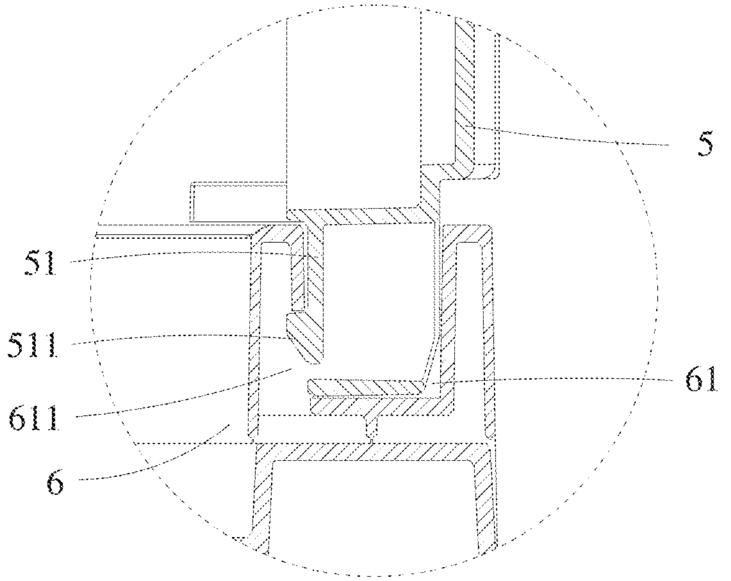
FIG. 7 is a schematic diagram of an assembly section of a first interlocking column and a first interlocking socket according to an example of the present disclosure.
Figure 8:
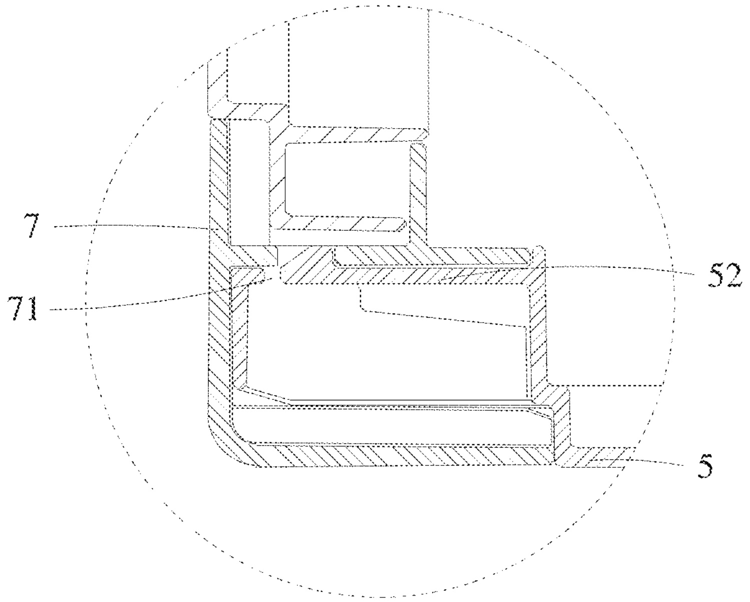
FIG. 8 is a schematic diagram of an assembly section of a second interlocking column and a second interlocking socket according to an example of the present disclosure.
Figure 9:
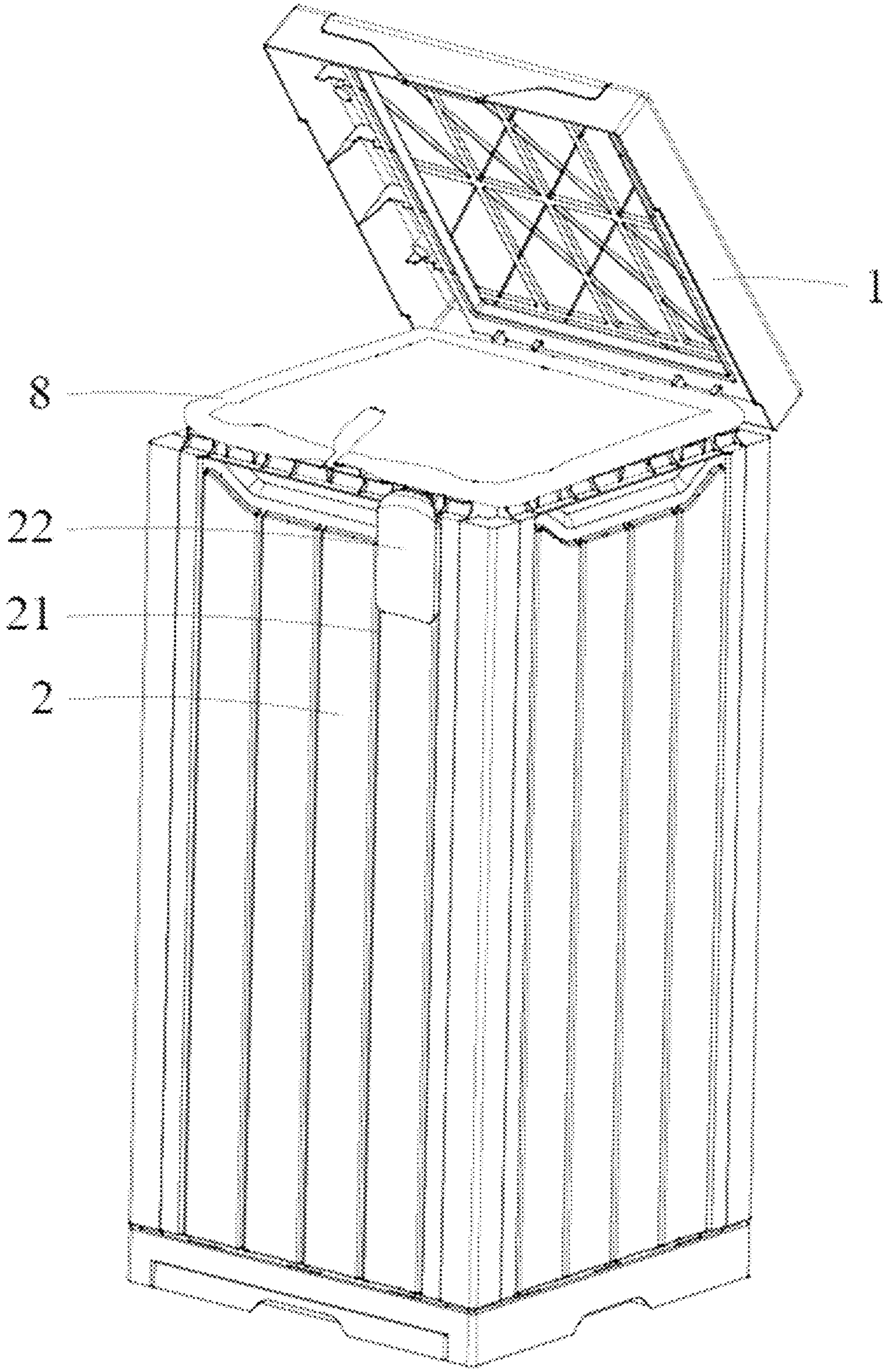
FIG. 9 is a schematic fixation diagram of a trash bag of a trash can according to an example of the present disclosure.
Figure 10:
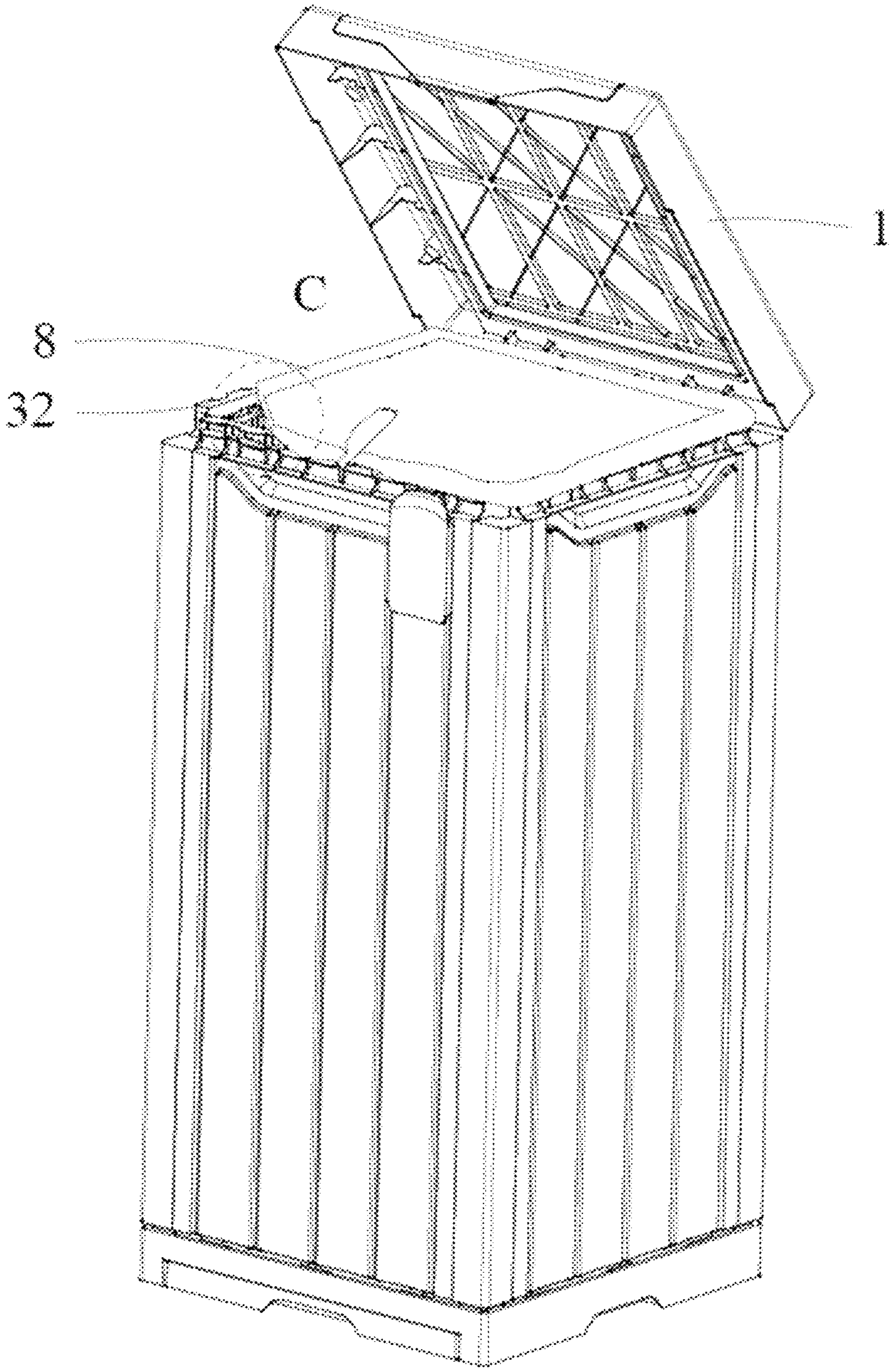
FIG. 10 is a schematic fixation diagram of a trash bag of a trash can according to another example of the present disclosure.
Figure 11:
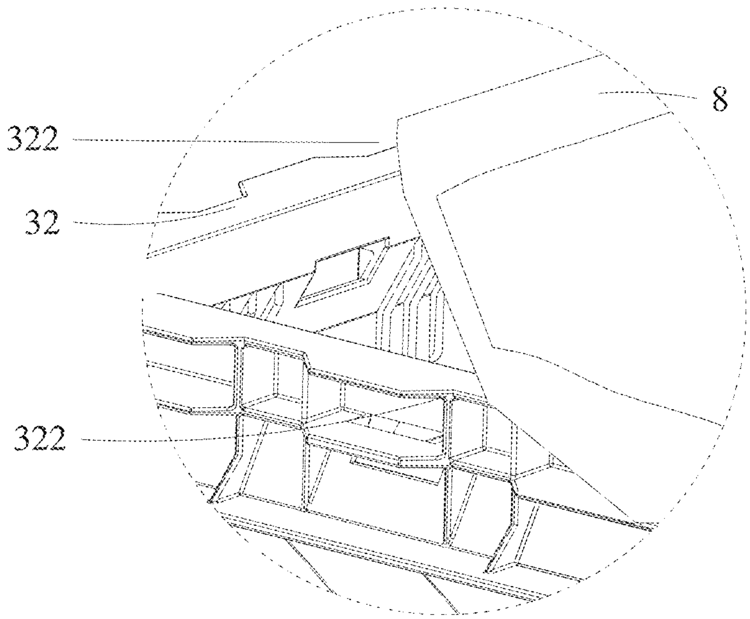
FIG. 11 is a schematic diagram of an enlarged view of C in FIG. 10.
Figure 12:
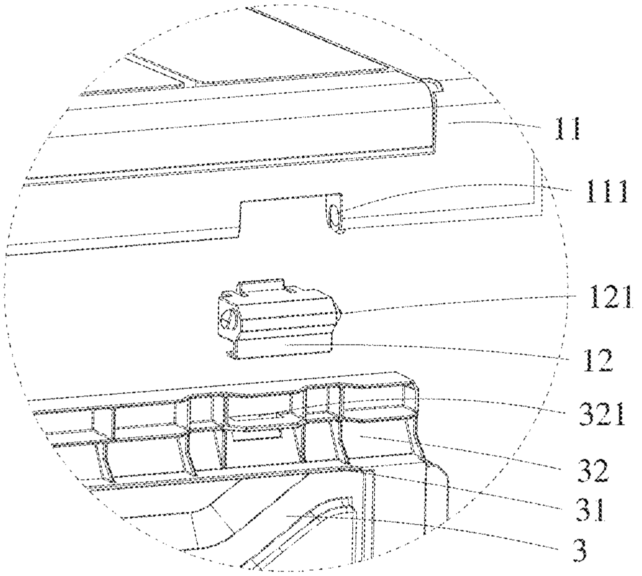
FIG. 12 is a schematic partial diagram of an exploded view of a cover assembly and a rear face plate according to an example of the present disclosure.
Figure 13:
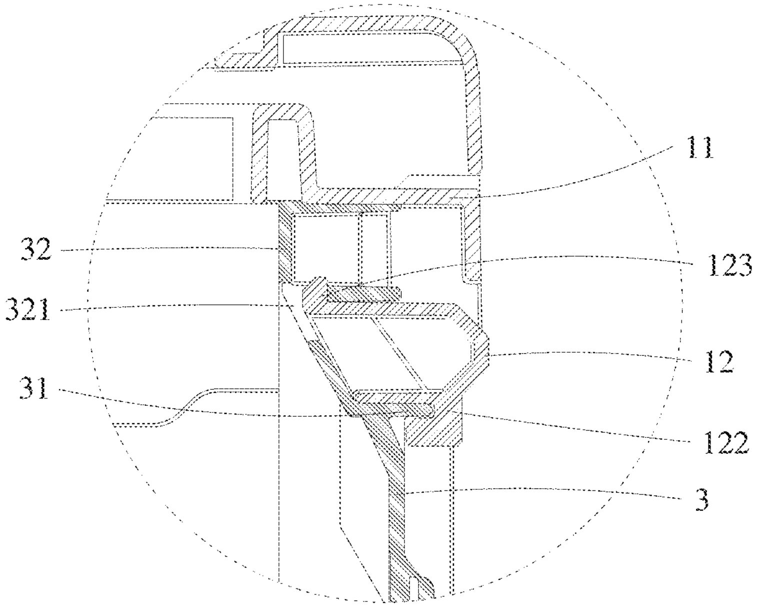
FIG. 13 is a schematic assembly diagram of a partial section of a cover assembly and a rear face plate according to an example of the present disclosure.
Figure 14:
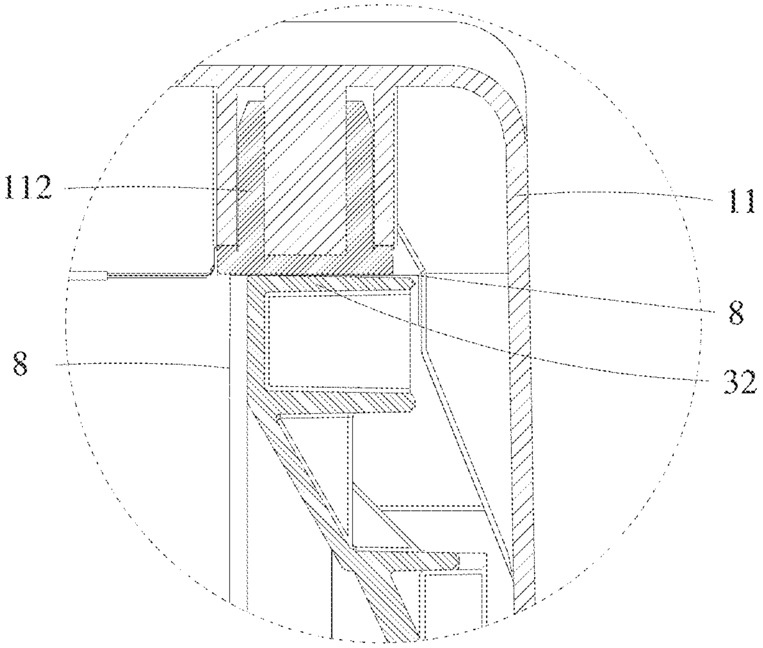
FIG. 14 is a schematic assembly diagram of a partial section of an anti-skid pad and a trash bag according to an example of the present disclosure.
Figure 15:
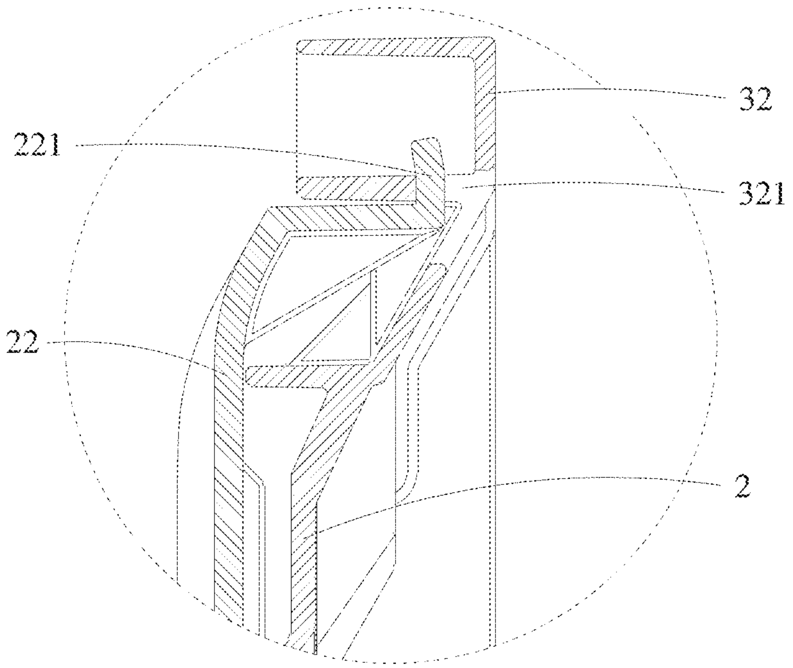
FIG. 15 is a schematic assembly diagram of a partial section of an indication plate and a front face plate according to an example of the present disclosure.

With reference to FIGS. 1-15, a trash can easy to produce according to the present disclosure includes a cover assembly 1, a front face plate 2, a rear face plate 3, a left face plate 4, a right face plate 5, a bottom face plate 6, and supporting columns 7. Each face plate is integrally formed through injection molding. After mounting of the trash can is completed, the front face plate 2, the rear face plate 3, the left face plate 4 and the right face plate 5 are located in the middle of the trash can, joints of the four side face plates are connected to each other by means of the supporting columns 7, and the front face plate 2, the rear face plat 3, the left face plate 4, the right face plate 5 and the supporting columns 7 constitute a body of the trash can having upper and lower openings. The cover assembly 1 is configured to seal a top of the trash can, which is located on a top or an upper portion of the body. The cover assembly 1 may open or close an opening of the trash can, into which trash is thrown. That is, the cover assembly 1 may open or close the upper opening of the body. The cover assembly 1 is hinged to the body. That is, the cover assembly 1 is rotatably connected to the body. The front face plate 2 is configured to seal a front surface of the trash can. The front face plate 2 is clamped to the cover assembly 1, such that the cover assembly 1 is fixed at a closed position. The rear face plate 3 is configured to seal a rear surface of the trash can. The rear face plate 3 and the front face plate 2 are arranged oppositely. The rear face plate 3 is connected to the cover assembly 1, and the rear face plate 3 supports the cover assembly 1. The left face plate 4 is configured to seal a left surface of the trash can. When the cover assembly 1 is at the closed position, the left face plate 4 supports the cover assembly 1. One end of the left face plate 4 is connected to the front face plate 2 and the rear face plate 3 by means of the supporting columns 7 separately. The right face plate 5 is configured to seal a right surface of the trash can. When the cover assembly 1 is at the closed position, the right face plate 5 supports the cover assembly 1. One end of the right face plate 5 is connected to the front face plate 2 and the rear face plate 3 by means of the supporting columns 7 separately. The bottom face plate 6 is configured to seal a bottom surface of the trash can. The bottom face plate 6 is clamped and fixed to the front face plate 2, the rear face plate 3, the left face plate 4 and the right face plate 5 separately. The bottom face plate 6 abuts against the supporting columns 7. The trash can may be internally provided with a trash bag 8. When the entire cover assembly 1 is at an open position, a user may place or take the trash bag 8. When the entire cover assembly 1 is at the closed position, the trash bag 8 is located between the body and the cover assembly 1. Each face plate and a structure of the trash can are made of plastic.

Specifically, the bottom face plate 6 is provided with first interlocking sockets 61. Opening of the first interlocking sockets 61 face upward, and the first interlocking sockets 61 are located on an edge of the bottom face plate 6. The right face plate 5 includes first interlocking columns 51. The first interlocking columns 51 are located on a bottom of the right face plate 5 or at a joint between the right face plate 5 and the bottom face plate 6. The first interlocking columns 51 are clamped to the first interlocking sockets 61 in a matched manner. That is, when the first interlocking columns 51 are cylindrical, square, etc., the first interlocking sockets 61 are in a matching shape. In this way, the first interlocking columns 51 may be partially or completely accommodated in the first interlocking sockets 61. In the example, the first interlocking columns 51 have polygonal outlines. The plurality of first interlocking columns 51 are arranged in a linear manner. Accordingly, the plurality of first interlocking sockets 61 located at a right side of the bottom face plate 6 are arranged in a linear manner. When the plurality of first interlocking columns 51 are clamped to the plurality of first interlocking sockets 61 in a matched manner, the bottom face plate 6 is vertically clamped and fixed to the left face plate 3.

The bottom face plate 6 includes enclosure plates 62 and baffles 63. The enclosure plates 62 are located on an outermost edge of the bottom face plate 6, and four side surfaces of the bottom face plate 6 are all provided with the enclosure plates 62. The baffles 63 are located on inner sides of the enclosure plates 62 and opposite the enclosure plates 62. Both the enclosure plates 62 and the baffles 63 may reinforce the bottom face plate 6. The enclosure plates 62 and the baffles 63 are of at least partially hollow structures, such that product weights and production materials and cost can be reduced, and shrinkage of plastics after injection molding can be reduced, which decreases its influence on appearance and structure of the bottom face plate 6.

The first interlocking sockets 61 are located between the enclosure plates 62 and the baffles 63. Parts of the enclosure plates 62 and the baffles 63 are used as two side walls of the first interlocking sockets 61. The first interlocking sockets 61 are provided with fixing recesses 611. Each fixing recess 611 is located on one of the enclosure plate 62 and the baffle 63. An opening of the fixing recess 611 faces the other of the enclosure plate and the baffle. The first interlocking columns 51 include bosses 511. The bosses 511 are matched with the fixing recesses 611. The bosses 511 extend from the first interlocking columns 51 toward the fixing recesses 611. When the first interlocking columns 51 are completely matched with the first interlocking sockets 61, the bosses 511 are matched with the fixing recesses 611, and the bosses 511 are at least partially located in the fixing recesses 611. When the first interlocking columns 51 and the first interlocking sockets 61 are switched from a clamped state to a separated state, the bosses 511 abut against walls of the fixing recesses 611. That is, cooperation between the bosses 511 and the fixing recesses 611 prevents the first interlocking columns 51 from being separated from the first interlocking sockets 61, such that fixing stability of the trash can be enhanced.

The supporting columns 7 are clamped to the right face plate 5. Specifically, the right face plate 5 includes a plurality of second interlocking columns 52. The second interlocking columns 52 are located at left and right sides of the right face plate 5. The plurality of second interlocking columns 52 are arranged in two linear rows, and the second interlocking columns 52 at two sides extend outward from the right face plate 5. An extension direction is located in a plane where the right face plate 5 is located. The supporting columns 7 are provided with a plurality of second interlocking sockets 71. The second interlocking sockets 71 are arranged in two rows. Each row of second interlocking sockets 71 are arranged in a linear layout. Opening directions of the two rows of second interlocking sockets 71 are perpendicular to each other. The row of second interlocking columns 52 at a left side of the right face plate 5 are clamped and fixed to one of the supporting columns 7. The row of second interlocking columns 52 at a right side of the right face plate 5 are clamped and fixed to the other supporting column 7.

The front face plate 2, the rear face plate 3, the left face plate 4 and the right face plate 5 have a same structure, and the four face plates are all manufactured with one mold, such that mold manufacturing cost can be reduced, and further production cost can be decreased. That is, the front face plate 2, the rear face plate 3, the left face plate 4 and the right face plate 5 are injection-molded with a same mold. Four supporting columns 7 are configured to connect the front face plate 2 and the left face plate 4, the front face plate 2 and the right face plate 5, the rear face plate 3 and the left face plate 4, and the rear face plate 3 and the right face plate 5, respectively. A clamping mode of the supporting columns 7 and all the face plates is the same as that of the right face plate 5 and the supporting column 7, which will not be repeated herein. The second interlocking columns 52 and the second interlocking sockets 71 are further provided with structures similar to the bosses 511 and the fixing recesses 611, such that risks that the second interlocking columns 52 are separated from the second interlocking sockets 71 can be reduced. A clamping mode of the bottom face plate 6 and all the face plates is the same as that of the right face plate 5 and the bottom face plate 6, which will not be repeated herein.

The cover assembly 1 includes a cover frame 11 and a connector 12. The cover frame 11 is located on an outer edge of the cover assembly 1. The cover frame 11 is rotatably connected to the connector 12. Specifically, the cover frame 11 is provided with a hinge seat 111. The connector 12 includes a hinge column 121. The hinge column 121 is matched with the hinge seat 111. The hinge column 121 is partially or completely accommodated in the hinge seat 111.

The front face plate 2, the rear face plate 3, the left face plate 4 and the right face plate 5 have the same structure. The connector 12 may be connected to any one of the front face plate 2, the rear face plate 3, the left face plate 4 and the right face plate 5. The user does not need to determine specific positions of the face plates separately during assembly, and may assemble the trash can conveniently. In the present disclosure, the connector 12 is clamped and fixed or detachably connected to the rear face plate 3. Specifically, the connector 12 further includes a first buckle 122 and a second buckle 123. A top of the rear face plate 3 is provided with a top wall 31 and a flange 32 extending upward from the top wall 31. That is, the flange 32 is located above the top wall 31. Clearly, the front face plate 2, the rear face plate 3 and the left face plate 4 are each provided with a top wall 31 and a flange 32. One side of the top wall 31 is matched with the first buckle 122. First fixing of the connector 12 and the rear face plate 3 is implemented through cooperation of the top wall 31 and the first buckle 122. The flange 32 is provided with a mounting part 321. The connector 12 includes the second buckle 123. The second buckle 123 is matched with the mounting part 321. In the present disclosure, the second buckle 123 is clamped to a recess or a through hole on the mounting part 321 in a matched manner. Clearly, the second buckle 123 may be directly clamped to a physical structure of the mounting part 321. The connector 12 is detachably connected and fixed to the rear face plate 3, which facilitates transport and assembly, and facilitates replacement if a component is damaged.

The connector 12 is fixedly connected to the rear face plate 3, and the connector 12 is rotatably connected to the cover frame 11, such that the cover frame 11 is rotatably connected to the rear face plate 3. That is, the cover frame 11 has an open state and a closed state relative to the rear face plate 3. When the cover frame 11 is in the open state, the user may place the trash bag 8 into the trash can. When the cover frame 11 is in the closed state, the trash bag 8 is pressed on a top of the body by means of the cover frame 11. Specifically, the cover frame 11 is provided with an anti-skid pad 112. The anti-skid pad 112 is located at an inner side of the cover frame 11, which is one side of the cover frame 11 facing the body. The anti-skid pad 112 may be fixed to the cover frame 11 through a plurality of points, or may be a strip at the inner side of the cover frame 11. The anti-skid pad 112 may be made of soft silicone or other materials having large friction, and especially a material capable of increasing a friction force in contact with the trash bag 8 under same pressure. After the trash bag 8 is placed and the cover frame 11 is closed, the cover frame 11 presses the anti-skid pad 112, and the anti-skid pad 112 presses the trash bag 8 to a top of the flange 32. Alternatively, part of the cover frame 11 directly presses the trash bag 8 to the top of the flange 32, and part of the cover frame further presses the trash bag 8 to the top of the flange 32 by pressing the anti-skid pad 112. The anti-skid pad 112 presses the trash bag 8, such that stability of the trash bag 8 mounted can be increased, so as to reduce a possibility that the trash bag 8 falls into the trash can when the user throws trash.

The flange 32 is provided with a notch 322. Each face plate having the flange 32 is provided with a plurality of notches 322. Openings of the notches 322 face away from an interior of the trash can. In order to facilitate mounting, one of the notches 322 of the rear face plate 3 may be located at a same position as the mounting part 321 on the flange 32. When the trash bag 8 is mounted, the trash can of the present disclosure may adapt to trash bags 8 having different opening diameters, which provides diversified choices for the user. If an opening diameter of the trash bag 8 selected by the user is greater than an opening size of the body, when the user sleeves the trash can with the trash bag 8, the trash bag 8 is arranged around the flanges 32 of the four face plates of the body, the top of the flange 32 of each face plate is completely covered with the trash can, and then an edge of a redundant part of the trash bag 8 is placed in the recess between the flange 32 and the top wall 31, or twisted into a rope and placed in the recess in the middle of the flange 32. Alternatively, if an opening diameter of the trash bag 8 selected by the user is not greater than an opening size of the body, when the user sleeves the trash can with the trash bag 8, the garbage bag 8 wraps around part of the flange 32. The trash bag 8 covers at least one flange 32 of the four face plates of the body, and the trash bag 8 may be clamped and fixed by means of the notch 322 on the flange 32, such that the trash bag 8 having a small opening diameter can be fixed.

Specifically, an edge of the trash bag 8 having a small opening diameter sleeves the flange 32 of the rear face plate 3, wraps the top of the flange 32 of the rear face plate 3, and then wraps a top of part of the flange 32 on the left face plate 4 and the right face plate 5, or wraps a top of part of the flange 32 on the left face plate 4 and tops of all the flanges on the right face plate 5. Finally, the edge of the trash bag 8 includes a top of part of the flange 32 of the front face plate 2. The trash bag 8 inclines from the notch 322 on the flange 32 of the left face plate 4 to the notch 322 on the flange 32 of the front face plate 2. The wall of the notch 322 is configured to clamp the trash bag 8, which reduces a possibility that the trash bag 8 is separated.

The front face plate 2 is provided with a plurality of vertical recesses 21. Bottom walls and side walls of the vertical recesses 21 extend to the interior of the trash can or are located in the trash can. That is, openings of the vertical recesses 21 face an exterior of the trash can. The bottom walls and the side walls of the vertical recesses 21 can reinforce the front face plate 2. One side of the front face plate 2 facing the interior of the trash can is provided with no cross bars, so as to reduce a possibility that the trash bag 8 is scratched by the cross bars.

The front face plate 2 is further provided with an indication plate 22. The indication plate 22 is configured to set an indicator of the trash can, such as trash classes of recyclable trash, kitchen waste, etc. A top of the indication plate 22 is clamped to the mounting part 321 on the front face plate 2. For instance, the top of the indication plate 22 is clamped to a hole or a recess of the mounting part 321. A middle portion of the indication plate 22 is accommodated in the vertical recesses 21.

After mounting of the trash can is completed, the top wall of the cover assembly 1 is inclined at an angle of 3° compared with a horizontal plane, such that accumulation of water on the cover assembly 1 can be reduced.

Obviously, it should be noted that "first", "second", etc. mentioned in the description and claims herein are used to distinguish different structures, apparatuses, components, etc., instead of representing a sequence and limiting different types by "first" and "second". "Include" or "comprise", an open term, should be interpreted as "including but not limited to" or "comprising but not limited to". "Roughly" and "generally" indicate that within an acceptable error range, those skilled in the art can solve the technical problems within a certain error range and basically achieve the technical effects. The terms "connected", "connection", "fix", etc. are to be construed broadly. For instance, the "connection" may be fixed connection, or detachable connection, or integral connection. The "fixed connection" may also be "integral forming". The "connection" may be direct connection, or indirect connection through an intermediary medium, unless expressly defined otherwise. For those of ordinary skill in the art, specific meanings of the above terms in the present disclosure can be understood according to specific circumstances. "Perpendicular" herein should be understood to be within a process error range, or an included angle at a perpendicular position is within a range of 80°-100°. "Parallel" should be understood to be within a process error range, with a process error of about 10°. The term "and/or" used in the description and the appended claims of the present disclosure refers to any combination and all possible combinations of one or more of the associated listed items, and includes these combinations.

Although the examples of the present disclosure are shown and described above, understandably, what are described above are merely preferred examples of the present disclosure, and are not intended to limit the present disclosure in any form. Although the present disclosure is disclosed as above through the preferred examples, these examples are not for defining the present disclosure. Those skilled in the art can make some alterations or modifications with the technical contents disclosed above without departing from the scope of the technical solutions of the present disclosure so as to arrive at equivalent examples with equivalent changes. However, any simple amendments, equivalent changes, and modifications made to the above examples according to the technical essence of the present disclosure without departing from the contents of the technical solutions of the present disclosure still fall within the scope of the technical solutions of the present disclosure.

What it claimed is:

1. A trash can easy to produce, comprising a left face plate configured to seal a left side of the trash can, a right face plate configured to seal a right side of the trash can, a front face plate configured to seal a front side of the trash can, a rear face plate configured to seal a rear side of the trash can, and a bottom face plate configured to seal a bottom of the trash can, wherein at least one of the left face plate, the right face plate, the rear face plate and the front face plate is clamped and fixed to the bottom face plate;

wherein the left face plate, the right face plate, the rear face plate and the front face plate all have a same structure; and alternatively, the left face plate, the right face plate, the rear face plate and the front face plate are all injection-molded with a same mold;

the trash can comprises a connector and a cover assembly that is located on a top of the trash can, wherein the cover assembly is rotatably connected to the rear face plate by means of the connector, and the connector is clamped or detachably connected to the rear face plate; and wherein the rear face plate comprises a top wall on a top of the rear face plate and a flange extending upward from the top wall, the connector comprises a first buckle and a second buckle, the first buckle is clamped and fixed to the top wall, and the second buckle is clamped and fixed to the flange.

2. The trash can easy to produce according to claim 1, wherein the flange comprises a mounting part matched with the second buckle, and the mounting part is clamped and fixed to the second buckle.

3. The trash can easy to produce according to claim 1, wherein the connector comprises a hinge column configured for rotary connection, the cover assembly comprises a cover frame located on an outer edge of the cover assembly, the cover frame is provided with a hinge seat matched with the hinge column, and the hinge column is at least partially accommodated in the hinge seat.

4. The trash can easy to produce according to claim 2, wherein the front face plate is provided with an indication plate, the indication plate comprises a third buckle, and the third buckle is clamped to the mounting part located on the front face plate.

5. The trash can easy to produce according to claim 3, comprising a trash bag, wherein an opening of the trash bag sleeves the flange; and alternatively, the flange is provided with a notch, the trash bag is partially located in the notch, and a wall of the notch abuts against the trash bag.

6. The trash can easy to produce according to claim 5, wherein the cover frame is provided with an anti-skid pad, the anti-skid pad abuts against the trash bag, the flange supports the trash bag, and the trash bag is partially located between the anti-skid pad and the flange.

7. The trash can easy to produce according to claim 1, wherein the right face plate comprises a first interlocking column located on a bottom of the right face plate, the bottom face plate is provided with a first interlocking socket matched with the first interlocking column, the first interlocking column is at least partially accommodated in the first interlocking socket, and the first interlocking column is clamped to the first interlocking socket; and the first interlocking column comprises a boss structure, the first interlocking socket is provided with a fixing recess, and the boss is clamped to the fixing recess.

8. A trash can easy to produce, comprising a left face plate configured to seal a left side of the trash can, a right face plate configured to seal a right side of the trash can, a front face plate configured to seal a front side of the trash can, a rear face plate configured to seal a rear side of the trash can, and a bottom face plate configured to seal a bottom of the trash can, wherein at least one of the left face plate, the right face plate, the rear face plate and the front face plate is clamped and fixed to the bottom face plate;

wherein the left face plate, the right face plate, the rear face plate and the front face plate all have a same structure; and alternatively, the left face plate, the right face plate, the rear face plate and the front face plate are all injection-molded with a same mold;

the trash can comprises a connector and a cover assembly that is located on a top of the trash can, wherein the cover assembly is rotatably connected to the rear face plate by means of the connector, and the connector is clamped or detachably connected to the rear face plate; and wherein the connector comprises a hinge column configured for rotary connection, the cover assembly comprises a cover frame located on an outer edge of the cover assembly, the cover frame is provided with a hinge seat matched with the hinge column, and the hinge column is at least partially accommodated in the hinge seat.

9. The trash can easy to produce according to claim 8, comprising a trash bag, wherein an opening of the trash bag sleeves the flange; and alternatively, the flange is provided with a notch, the trash bag is partially located in the notch, and a wall of the notch abuts against the trash bag.

10. The trash can easy to produce according to claim 9, wherein the cover frame is provided with an anti-skid pad, the anti-skid pad abuts against the trash bag, the flange supports the trash bag, and the trash bag is partially located between the anti-skid pad and the flange.

* * * * *